US012560444B2

(12) United States Patent
Goldman et al.

(10) Patent No.: US 12,560,444 B2
(45) Date of Patent: Feb. 24, 2026

(54) JOINT ROUTING OF TRANSPORTATION SERVICES FOR AUTONOMOUS VEHICLES

(71) Applicant: Uber Technologies, Inc., San Francisco, CA (US)

(72) Inventors: Brent Goldman, San Francisco, CA (US); Jacob Robert Forster, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 258 days.

(21) Appl. No.: 17/249,021

(22) Filed: Feb. 17, 2021

(65) Prior Publication Data

US 2022/0065638 A1     Mar. 3, 2022

Related U.S. Application Data

(60) Provisional application No. 62/706,623, filed on Aug. 28, 2020.

(51) Int. Cl.
| | |
|---|---|
| *G01C 21/34* | (2006.01) |
| *G08G 1/00* | (2006.01) |
| *G06Q 50/40* | (2024.01) |

(52) U.S. Cl.
CPC ..... *G01C 21/3453* (2013.01); *G01C 21/3446* (2013.01); *G08G 1/202* (2013.01); *G06Q 50/40* (2024.01)

(58) Field of Classification Search
CPC ............ G01C 21/3453; G01C 21/3446; G08G 1/202; G06Q 50/30
See application file for complete search history.

(56) References Cited

U.S. PATENT DOCUMENTS

| | | | | |
|---|---|---|---|---|
| 9,261,374 B2 * | 2/2016 | Mundinger | ........ | G01C 21/3438 |
| 2018/0189717 A1 * | 7/2018 | Cao | ........................ | G06Q 50/40 |

(Continued)

FOREIGN PATENT DOCUMENTS

WO     2022047478     3/2022

OTHER PUBLICATIONS

James Yu and Albert Lam, " Autonomous Vehicle Logistic System: Joint Routing and Charging Strategy," IEEE Transactions on Intelligent Transportation Systems, vol. 19, # 7, Jul. 2018. (Year: 2018).*

(Continued)

*Primary Examiner* — Joan T Goodbody
(74) *Attorney, Agent, or Firm* — Schwegman Lundberg & Woessner, P.A.

(57) ABSTRACT

Various examples are directed to a service assignment system for providing transportation services. The service assignment system may receive a transportation service request from a user. The transportation service request may describe a transportation service having a service start location and a service end location. The service assignment system may generate a plurality of routes for executing the transportation service. The service assignment system may send proposed route data describing at least a portion of the plurality of routes to a first autonomous vehicle (AV). The service assignment system may receive, from the first AV, route data describing a first route to execute the transportation service and send, to the first AV, instruction data instructing the first AV to begin executing the transportation service.

19 Claims, 7 Drawing Sheets

(56) References Cited

U.S. PATENT DOCUMENTS

| | | | |
|---|---|---|---|
| 2018/0211186 A1* | 7/2018 | Rakah | B60W 60/00253 |
| 2018/0341887 A1* | 11/2018 | Kislovskiy | G08G 1/202 |
| 2019/0086221 A1* | 3/2019 | Thiyagarajan | G01C 21/3423 |
| 2019/0333390 A1* | 10/2019 | Woodrow | G06Q 10/08 |
| 2020/0134525 A1 | 4/2020 | Goldman et al. | |

OTHER PUBLICATIONS

P. Sathya Narayanan and C. S. Joice, "Vehicle-to-Vehicle (V2V) Communication using Routing Protocols: A Review," 2019 International Conference on Smart Structures and Systems (ICSSS), Chennai, India, 2019, pp. 1-10. (Year: 2019).*

M. Desertot, S. Lecomte and T. Delot, "A dynamic service-oriented framework for the transportation domain," 2009 9th International Conference on Intelligent Transport Systems Telecommunications, (ITST), Lille, France, 2009, pp. 325-329. (Year: 2009).*

Y. Lai, F. Yang, L. Zhang and Z. Lin, "Distributed Public Vehicle System Based on Fog Nodes and Vehicular Sensing," in IEEE Access, vol. 6, pp. 22011-22024, 2018. (Year: 2018).*

"International Application Serial No. PCT US2021 071277, International Search Report mailed Jan. 5, 2022", 4 pgs.

"International Application Serial No. PCT US2021 071277, Written Opinion mailed Jan. 5, 2022", 6 pgs.

"International Application Serial No. PCT US2021 071277, International Preliminary Report on Patentability mailed Mar. 9, 2023", 8 pgs.

* cited by examiner

400

402 — RECEIVE TRANSPORTATION SERVICE REQUEST

404 — SELECT SET OF AVS FOR TS INCLUDING 1ST AND 2ND AVS

406 — GENERATE PLURALITY OF ROUTES

408 — SEND 1ST AV ROUTES TO 1ST AV

410 — SEND 2ND AV ROUTES TO 2ND AV

412 — RECEIVE ROUTE INDICATORS FROM 1ST AND 2ND AVS

414 — SELECT AV FOR TS

416 — SEND SELECTED AV INSTRUCITON DATA TO BEGIN EXECUTING TS

500

502 — RECEIVE ACTUAL ROUTE
DATA FROM A PAST TS
EXECUTION

504 — COMPARE ACTUAL ROUTE
DATA WITH INTENDED
ROUTE DATA

506 — SELECT SET OF ROUTES
FOR TS USING PAST TS
EXECUTION DATA

700

702 PROCESSOR
724 INSTR.

704 MAIN MEMORY
724 INSTR.

706 STATIC MEMORY

720 NETWORK INTERFACE DEVICE

726 NETWORK

708 BUS

710 VIDEO DISPLAY

712 ALPHA-NUMERIC INPUT DEVICE

714 UI NAVIGATION DEVICE

716 STORAGE DEV.
722 M-R MEDIUM
724 INSTR.

718 SIGNAL GENERATION DEVICE

JOINT ROUTING OF TRANSPORTATION SERVICES FOR AUTONOMOUS VEHICLES

CLAIM FOR PRIORITY

This application claims the benefit of priority of U.S. Application Ser. No. 62/706,623, filed Aug. 28, 2020, which is hereby incorporated by reference in its entirety.

FIELD

This document pertains generally, but not by way of limitation, to devices, systems, and methods for routing, operating, and/or managing an autonomous vehicle (AV).

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
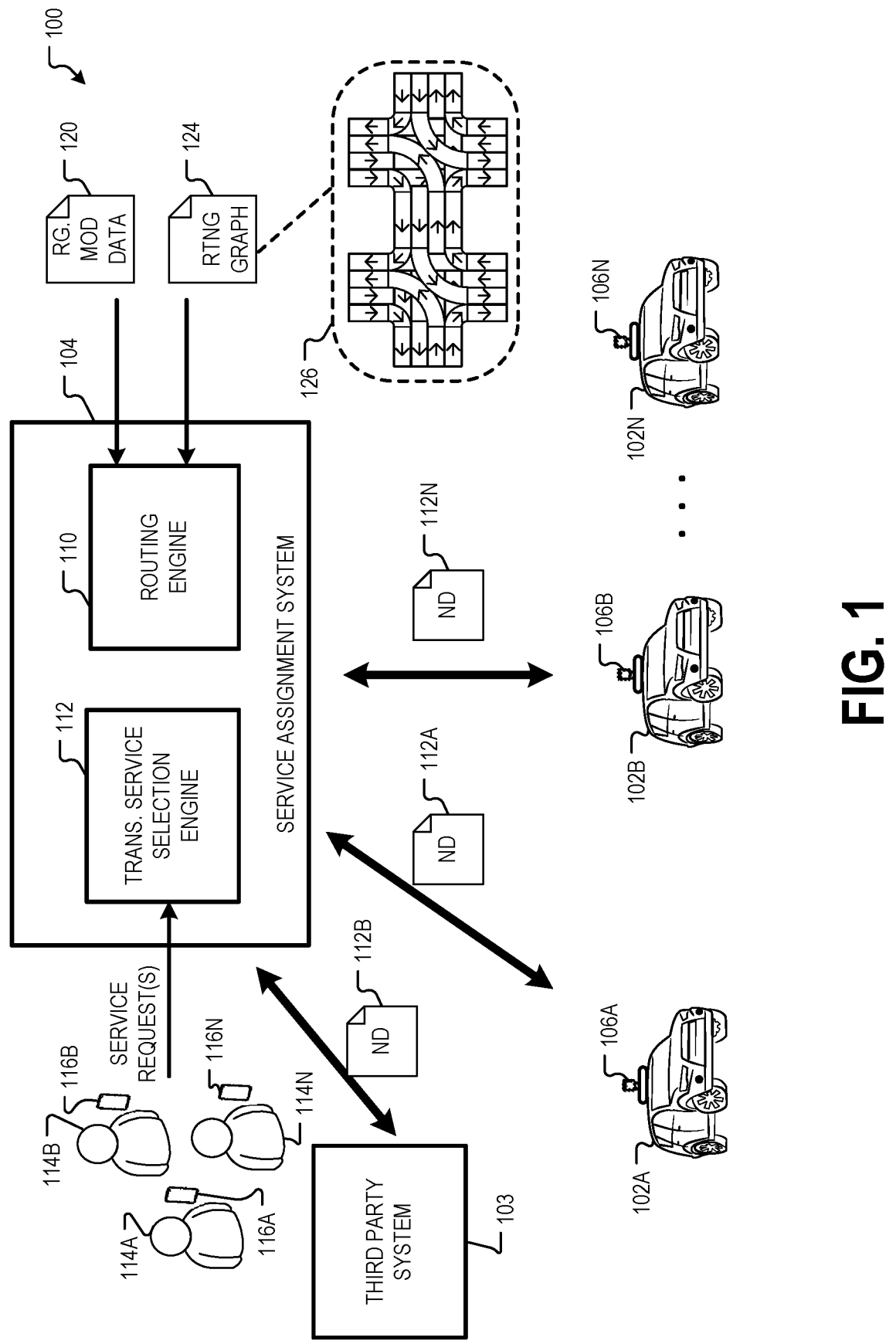
FIG. 1 is a diagram showing one example of an environment for jointly routing autonomous vehicles.

Examples described herein are directed to systems and methods for routing autonomous vehicles to execute transportation services. A transportation service includes transporting a payload, such as cargo or one or more passengers, from a service start location to a service end location. Examples of cargo can include food, packages, or the like.

In an autonomous or semi-autonomous vehicle (collectively referred to as an autonomous vehicle (AV)), a vehicle autonomy system, sometimes referred to as an AV stack, controls one or more of braking, steering, or throttle of the vehicle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

In some examples, a service assignment system is configured to receive requests for transportation services from users. The service assignment system selects an AV to execute the transportation service for the user and instructs the AV to begin executing the transportation service.

Assigning transportation services to AVs creates problems that may not be encountered with human-operated vehicles. For example, different AVs having different capabilities may be routed differently. For example, some AVs may deliberately route around roadway features such as, for example, unprotected left turns. Also, in some examples, different types of AVs, for example, implemented by different parties, may have different policies about whether or when to traverse potentially sensitive roadway elements, such as those in school zones, parks, etc.

For these and other reasons, it may not be accurate for a service assignment system to make assumptions about the route that an AV will traverse to execute a transportation service. This can create complications for the service assignment system. For example, a service assignment system may select an AV for a particular transportation service based on the time that it will take for the AV to execute the transportation service. If the AV does not use the route that the service assignment system expects, however, the actual time to execute the service may deviate from what was assumed by the service assignment system.

Further, it may not be practical for the service assignment system to dictate the route that an AV must use to execute a transportation service. For example, the service assignment system may lack complete access to the capabilities and/or policies of the operator of the AV. Routes determined without access to the complete vehicle capabilities and/or policies associated with an AV may be sub-optimal for the AV itself. In some cases, the AV may not be capable of executing the service assignment system-generated route. Also, in some examples, the owner or operator of an AV may have priorities that are different than those of the service assignment system. For example, it may be desirable for an AV owner or operator to use routes that position the AV to execute additional transportation services, assigned by the service assignment system and/or by another service assignment system.

In some examples, these and other difficulties are addressed utilizing joint routing between the service assignment system and an AV. For example, upon receiving a transportation service request, the service assignment system generates a plurality of proposed routes for executing the transportation service. The proposed routes may begin at a vehicle location and extend to the service start location and the service end location.

The proposed routes may be generated for a single AV and/or for multiple AVs. The service assignment system sends proposed route data to the first AV, where the proposed route data describes at least a portion of the proposed routes (e.g., a portion of the proposed routes that were generated for the first AV). The first AV may respond by providing an indication of an intended route or routes that the first AV will execute to perform the transportation service. The intended route may be one of the routes described by the proposed route data or a different route. If the intended route indicated by the first AV is acceptable to the service assignment system, the service assignment system instructs the first vehicle to begin executing the transportation service.

In some examples, the service assignment system selects more than one AV to jointly route a transportation service. For example, upon receiving a request for a transportation service, the service assignment system may select multiple candidate AVs for executing the transportation service. The service assignment system generates routes for the candidate AVs to execute the transportation service. Each candidate AV may receive proposed route data describing a plurality of routes that could be used by that candidate AV to execute the transportation service. One or more of the candidate AVs may return intended route data describing intended routes that the AV would use to execute the transportation service. The service assignment system uses the returned data to select one of the AVs to execute the transportation service. For example, the service assignment system may select the AV having an intended route that achieves an earlier time of arrival at the service start location, a faster drop-off time to the service end location, a lesser risk of adverse result, etc.

In some examples, the service assignment system considers data from additional parties when selecting a route for a transportation service. For example, a user requesting a transportation service may be provided with an indication of one or more routes for one or more candidate AVs and may provide an indication of a preferred route. The indication of the user's preferred route may be considered by the service assignment system to select one of the AVs to execute the transportation service and/or a route for the selected AV.

FIG. 1 is a diagram showing one example of an environment 100 for jointly routing autonomous vehicles. The environment 100 includes a service assignment system 104 and AVs 102A, 102B, 102N. The AVs 102A, 102B, 102N can include passenger vehicles, such as trucks, cars, buses, or other similar vehicles. The AVs 102A, 102B, 102N can also include delivery vehicles, such as vans, trucks, tractor trailers, etc. Although FIG. 1 shows three AVs 102A, 102B, 102N, any suitable number of vehicles may be used.

Figure 2:
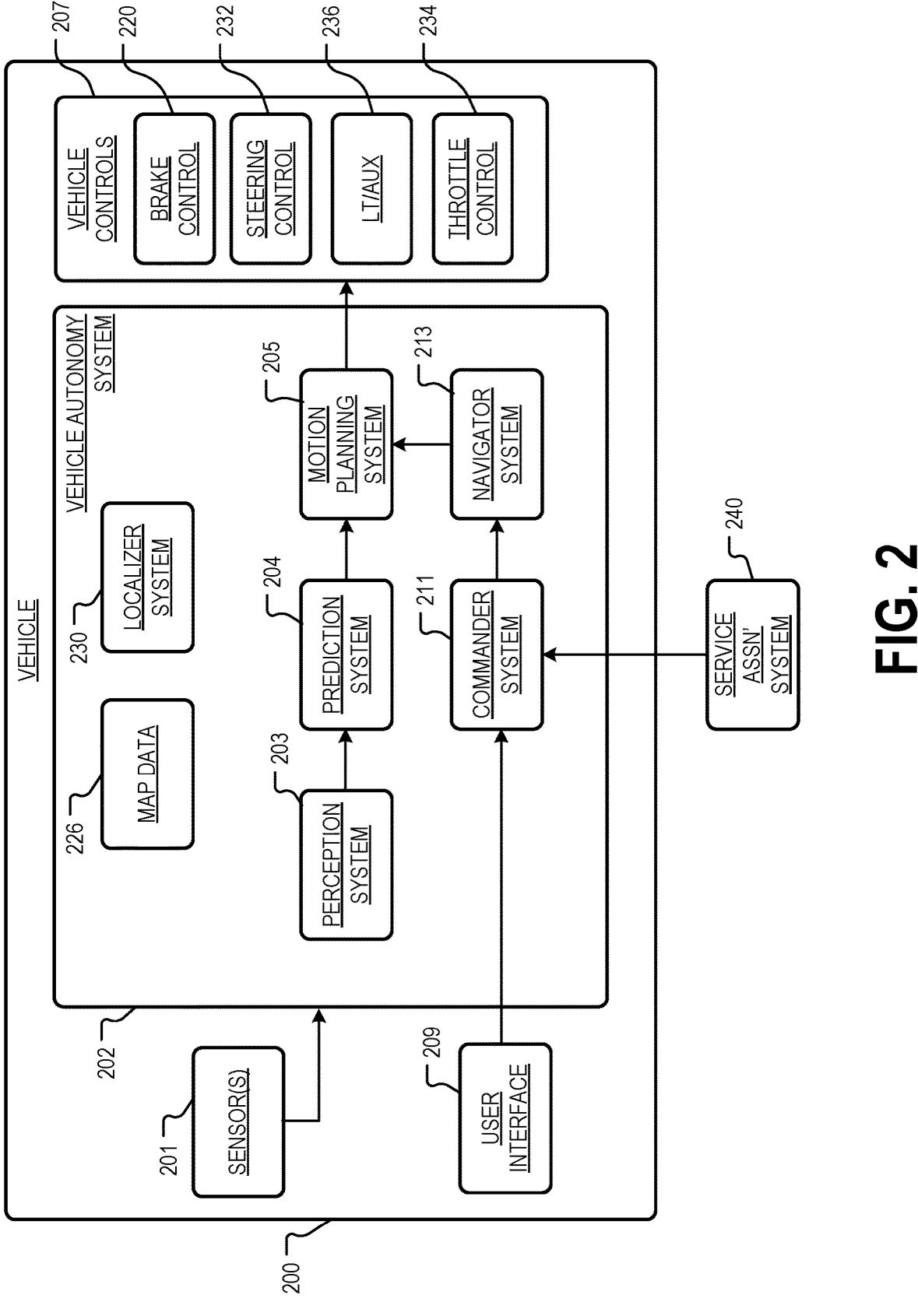
FIG. 2 depicts a block diagram of an example vehicle according to example aspects of the present disclosure.

Each of the AVs 102A, 102B, 102N includes a vehicle autonomy system, described in more detail with respect to FIG. 2. The vehicle autonomy system is configured to operate some or all of the controls of the AV 102A, 102B, 102N (e.g., acceleration, braking, steering). In some examples, one or more of the AVs 102A, 102B, 102N are operable in different modes, where the vehicle autonomy system has differing levels of control over the AV 102A, 102B, 102N. Some AVs 102A, 102B, 102N may be operable in a fully autonomous mode in which the vehicle autonomy system has responsibility for all or most of the controls of the AV 102A, 102B, 102N. Some AVs 102A, 102B, 102N are operable in a semiautonomous mode that is in addition to or instead of the fully autonomous mode. In a semiautonomous mode, the vehicle autonomy system of an AV 102A, 102B, 102N is responsible for some of the vehicle controls while a human user or driver is responsible for other vehicle controls. In some examples, one or more of the AVs 102A, 102B, 102N are operable in a manual mode in which the human user is responsible for all controls of the AV 102A, 102B, 102N.

The AVs 102A, 102B, 102N include one or more remote-detection sensor sets 106A, 106B, 106N. The remote-detection sensor sets 106A, 106B, 106N include one or more remote-detection sensors that receive signals from the environment 100. The signals may be emitted by and/or reflected from objects in the environment 100, such as the ground, buildings, trees, etc. The remote-detection sensor sets 106A, 106B, 106N may include one or more active sensors, such as light imaging detection and ranging (LIDAR) sensors, radio detection and ranging (RADAR) sensors, and/or sound navigation and ranging (SONAR) sensors, that emit sound or electromagnetic radiation in the form of light or radio waves to generate return signals. Information about the environment 100 is extracted from the received signals. In some examples, the remote-detection sensor sets 106A, 106B, 106N include one or more passive sensors that receive signals that originated from other sources of sound or electromagnetic radiation. The remote-detection sensor sets 106A, 106B, 106N provide remote-detection sensor data that describes the environment 100. The AVs 102A, 102B, 102N can also include other types of sensors, for example, as described in more detail with respect to FIG. 2.

The AVs 102A, 102B, 102N may be of different types. Different types of AVs may have different capabilities. For example, the different types of AVs 102A, 102B, 102N can have different vehicle autonomy systems. This can include, for example, vehicle autonomy systems made by different manufacturers or designers, vehicle autonomy systems having different software versions or revisions, etc. Also, in some examples, the different types of AVs 102A, 102B, 102N can have different remote-detection sensor sets 106A, 106B, 106N. For example, one type of AV 102A, 102B, 102N may include a LIDAR remote-detection sensor, while another type of AV 102A, 102B, 102N may include stereoscopic cameras and omit a LIDAR remote-detection sensor. In some examples, different types of AVs 102A, 102B, 102N can also have different mechanical particulars. For example, one type of vehicle may have all-wheel drive, while another type may have front-wheel drive, etc.

The service assignment system 104 is programmed to assign transportation services to the AVs 102A, 102B, 102N as described herein. The service assignment system 104 can be or include one or more servers or other suitable computing devices. The service assignment system 104 is configured to receive transportation service requests from one or more users 114A, 114B, 114N. The users 114A, 114B, 114N make transportation service requests with user computing devices 116A, 116B, 116N. The user computing devices 116A, 116B, 116N can be or include any suitable computing device such as, for example, tablet computers, mobile telephone devices, laptop computers, desktop computers, etc. In some examples, the user computing devices 116A, 116B, 116N execute an application associated with a transportation service implemented with the service assignment system 104. The users 114A, 114B, 114N launch the application on the respective user computing devices 116A, 116B, 116N and utilize functionality of the application to make transportation service requests.

The service assignment system 104 comprises a transportation service selection engine 112 and a routing engine 110. The transportation service selection engine 112 is programmed to receive and process transportation service requests. Upon receiving a transportation service request, the transportation service selection engine 112 may select one or more candidate AVs 102A, 102B, 102N for executing the service. The set of candidate AVs 102A, 102B, 102N can include one or more AVs 102A, 102B, 102N that are best suited for executing the transportation service. For example, the set of candidate AVs 102A, 102B, 102N can include one or more AVs 102A, 102B, 102N that are near to a transportation service start position (e.g., within a threshold distance, within a threshold drive time).

In some examples, the candidate AVs 102A, 102B, 102N are limited to vehicles capable of executing the transportation service. For example, a transportation service that involves moving a large cargo object may be executable only by AVs 102A, 102B, 102N having sufficient space to carry the large object. A transportation service that involves moving, for example, five passengers may be executable only by AVs 102A, 102B, 102N having sufficient space to carry five passengers. As another example, a transportation service that involves traversing a portion of roadway that is not accessible to an AV 102A, 102B, 102N may be executable only by a human-driven vehicle.

The routing engine 110 generates a set of proposed routes for the transportation service. The set of proposed routes can include routes generated for AVs 102A, 102B, 102N of the one or more candidate AVs selected for the requested transportation service. For example, the transportation service selection engine 112 may provide an indication of the set of one or more candidate AVs 102A, 102B, 102N to the routing engine 110. The routing engine 110 generates proposed routes for some or all of the set of candidate AVs 102A, 102B, 102N. The proposed routes may begin at the location of a candidate vehicle and extend to the transportation service start position and transportation service end position. If the transportation service includes one or more waypoints, the proposed routes will also pass these waypoints.

The routing engine 110 of the service assignment system 104 generates routes using a routing graph 124. The routing graph 124 is a representation of the roadways in a geographic area. The routing graph 124 represents the roadways as a set of graph elements. A graph element is a component of a routing graph 124 that represents a roadway element on which the autonomous vehicle can travel. A graph element can be or include an edge, node, or other component of a routing graph. A graph element represents a portion of roadway, referred to herein as a roadway element. A roadway element is a component of a roadway that can be traversed by a vehicle.

A roadway element can be or include different subdivisions of a roadway, depending on the implementation. In some examples, the roadway elements are or include road segments. A road segment is a portion of roadway including all lanes and directions of travel. Consider a four-lane divided highway. A road segment of the four-lane divided highway includes a stretch of the highway including all four lanes and both directions of travel.

In some examples, roadway elements are or include directed road segments. A directed road segment is a portion of roadway where traffic travels in a common direction. Referring again to the four-lane divided highway example, a stretch of the highway can include at least two directed road segments: a first directed road segment including the two lanes of travel in one direction and a second directed road segment including the two lanes of travel in the other direction.

In some examples, roadway elements are or include lane segments. A lane segment is a portion of a roadway including one lane of travel in one direction. Referring again to the four-lane divided highway example, a portion of the divided highway may include two lane segments in each direction. Lane segments may be interconnected in the direction of travel and laterally. For example, a vehicle traversing a lane segment may travel in the direction to travel to the next connected lane segment or may make a lane change to move laterally to a different lane segment.

The routing graph 124 indicates data describing directionality and connectivity for the graph elements. The directionality of a graph element describes limitations, if any, on the direction in which a vehicle can traverse the roadway element corresponding to the graph element. The connectivity of a given graph element describes other graph elements to which the autonomous vehicle can be routed from the given graph element.

The routing graph 124 can also include cost data describing costs associated with graph elements. The cost data indicates the cost for a vehicle to traverse a roadway element corresponding to a graph element or to transition between roadway elements corresponding to connected graph elements. Cost can be based on various factors including, for example, estimated driving time, danger risk, etc. In some examples, higher cost generally corresponds to more negative characteristics of a graph element or transition (e.g., longer estimated driving time, higher danger risk). The routing engine 110 generates routes for vehicles by finding a low-cost combination of connected graph elements corresponding to a sequence of roadway elements between two locations.

In FIG. 1, a break-out window 126 shows example roadway elements that can correspond to the graph elements of the routing graph 124. Roadway elements in the break-out window 126 are illustrated as shapes with arrows indicating the directionality of the roadway elements. Roadway elements can be connected to one another according to their directionality.

The routing engine 110, in some examples, utilizes routing graph modification data 120 to generate constrained routing graph data. Routing graph modification data 120 indicates routing graph modifications that are applied to the routing graph 124 to generate a constrained routing graph. A routing graph modification is a change to a routing graph (e.g., a general-purpose routing graph) that reflects various factors including, for example, capabilities of the vehicle that is to execute a route, current roadway conditions, business policy considerations, and so on. A routing graph modification includes a graph element descriptor and a constraint.

A graph element descriptor is data describing one or more graph elements that are the subject of a routing graph modification. For example, a graph element descriptor can describe graph elements using one or more graph element properties. A graph element property is anything that describes a graph element and/or its corresponding roadway element. Example graph element properties include, for example, a unique identifier for the graph element, a roadway type of the corresponding roadway element (e.g., divided highway, urban street), a driving rule of the roadway element associated with the graph element (e.g., speed limit, access limitations), a type of maneuver necessary to enter, exit, and/or traverse the corresponding roadway element, whether the corresponding roadway element leads to a specific type of roadway element (e.g., dead end, divided highway), and so on. In some examples, a graph element descriptor including a unique indicator of a particular graph element can be used to generate a routing graph modification that is applied to the particular graph element.

A constraint is an action applied to graph elements at a routing graph that are described by the graph element descriptor of a routing graph modification. Example constraints that may be applied to a graph element include removing the graph element from the routing graph, modifying (e.g., removing) transitions to or from a graph element, changing a cost associated with a graph element or transitions involving the graph element, etc. Costs may be changed up or down. For example, if the routing graph modification data 120 indicates that graph elements having a particular graph element property or set of graph element properties are disfavored, the costs to traverse and/or transition to the corresponding roadway elements can be increased. On the other hand, if the routing graph modification data 120 indicates that graph elements having a particular graph element property or set of constraint properties are favored, the costs to traverse and/or transition to the corresponding roadway elements can be decreased.

Another example constraint can include changing a required or recommended autonomous vehicle mode. For example, a graph element can be modified to indicate that an autonomous vehicle traversing the roadway element corresponding to the graph element should be operated in a semi-autonomous or manual mode.

Consider an example in which a routing policy forbids routing a vehicle through roadway elements that include or are in a school zone. A routing graph modification may include graph element descriptor data identifying graph elements that correspond to roadway elements having a school zone. A corresponding constraint includes removing the graph elements corresponding to such school zone roadway elements from the routing graph 124 and/or removing transitions to such school zone roadway elements In some examples, a constraint can be applied to graph elements other than those indicated by the graph element descriptor data. Consider an example routing graph modification that is to avoid cul-de-sacs. The associated constraint could involve removing connectivity to graph elements corresponding to cul-de-sac roadway elements and also removing graph elements corresponding to roadway elements that do not include cul-de-sacs, but can lead only to other roadway elements that do include cul-de-sacs.

Routing graph modification data 120 can also include routing graph constraints related to vehicle capability. For example, vehicles of different types (e.g., autonomous vehicles, human-driven vehicles, different types of autonomous vehicles) can have different capabilities and, therefore, can be associated with different vehicle-capability-related routing graph modifications. Vehicle capability of the AV 102A, 102B, 102N may be and/or be derived from operation domain (OD) and/or operational design domain (ODD) data, if any, provided by the vehicle's manufacturer. In some examples, vehicle capability is supplemented based on the performance of the AV 102A, 102B, 102N or type of autonomous vehicle in executing transportation services. Routing graph modifications based on vehicle capability can include, for example, routing graph modifications that identify graph elements corresponding to roadway elements that have property or properties (e.g., includes an unprotected left, is part of a controlled access highway) and constraint data indicating what is to be done to route components having the indicated property or properties. The graph elements corresponding to roadway elements that a particular type of AV 102A, 102B, 102N is not capable of traversing can be removed from the routing graph or can have connectivity data modified to remove transitions to those graph elements. For example, one or more connections to a graph element may be removed. If the properties of a graph element indicate that it corresponds to a roadway element including a maneuver that is undesirable for a vehicle, but not forbidden, then the routing engine 110 can increase the cost of the graph element and/or transitions thereto.

Other routing graph modifications that can be described by the routing graph modification data 120 may include, for example, policy routing graph modifications and operational routing graph modifications. Policy routing graph modifications include graph element properties that identify roadway elements subject to a policy routing graph modification and corresponding routing graph modifications. Policy routing graph modifications refer to types of roadway elements that are desirable for a vehicle to avoid or prioritize. An example policy routing graph modification is to avoid roadway elements that are in or pass through school zones. Another example policy routing graph modification is to avoid routing vehicles through residential neighborhoods. Yet another example policy routing graph modification is to favor routing vehicles on controlled-access highways, if available. Policy routing graph modifications can apply to some vehicles, some vehicle types, all vehicles, or all vehicle types.

Operational routing graph modifications can be based, for example, on the state of one or more roadways. For example, if a roadway is to be closed for a parade or for construction, an operational routing graph modification identifies properties (e.g., names or locations) of roadway elements that are part of the closure and an associated routing graph modification (e.g., removing the corresponding graph elements, removing transitions to the corresponding graph elements).

The routing engine 110 applies the routing graph modification data 120 to generate the constrained routing graph. The constrained routing graph is used to generate a route for an AV 102A, 102B, 102N. In some examples, different constrained routing graphs are generated for different types of AVs 102A, 102B, 102N. The constrained routing graph can be pre-generated and/or generated on an as-needed basis as routes are determined.

The routing engine 110 determines a route for the AV 102A, 102B, 102N, for example, by applying a path-planning algorithm to the constrained routing graph to find the lowest-cost route for the vehicle. Any suitable path-planning algorithm can be used, such as, for example, A*, D*, Focused D*, D* Lite, GD*, or Dijkstra's algorithm. A generated route can include a string of connected graph elements that correspond to roadway elements between a vehicle start location and a vehicle end location. A vehicle start location is an initial roadway element of a route. A vehicle end location is a last roadway element of a route. In some examples, the vehicle start location is a current location of the relevant AV 102A, 102B, 102N, and the vehicle end location is the end location for the requested transportation service. For example, on the route, the AV 102A, 102B, 102N can travel from its current location to the transportation service start location, and then proceed to the transportation service end location, traversing transportation service waypoints (if any) along the way.

In some examples, the routing engine 110 applies routing feature flags. Routing feature flags modify the way that a routing graph, such as a constrained routing graph, is used to generate a route for an AV 102A, 102B, 102N. For example, a routing feature flag may describe a type of traversal of the constrained routing graph that is favored or disfavored for an AV 102A, 102B, 102N or type of AV.

Proposed routes determined by the routing engine 110 are provided to the transportation service selection engine 112. The service assignment system 104 (e.g., the transportation service selection engine 112) exchanges route negotiation data 112A, 112B, 112N with one or more of the AVs 102A, 102B, 102N. Consider first an example in which there is a single candidate AV (e.g., AV 102A). In this example, the routing engine 110 generates proposed routes for the single candidate AV 102A. The service assignment system 104 sends the AV 102A route negotiation data 112A including an indication of the proposed routes. The candidate AV 102A responds by providing route negotiation data 112A indicating an intended route or routes. The intended route or routes may be one or more of the proposed routes generated by the routing engine 110 and/or may be other routes (e.g., generated by the AV 102A and/or another routing engine associated with the AV 102A).

The service assignment system 104 (e.g., the transportation service selection engine 112 thereof) determines whether at least one of the intended routes is acceptable to the service assignment system 104. In some examples, if the intended route or routes includes one or more of the candidate routes generated by the routing engine 110, then those routes may be acceptable. In an example in which the intended route or routes are not generated by the routing engine 110, the service assignment system 104 may compare the intended route or routes to one or more policies and/or compare to one or more capabilities of the AV 102A, 102B, 102N, as known to the service assignment system.

If one or more of the intended routes is acceptable, the service assignment system 104 sends to the AV 102A an instruction to begin executing the transportation service, for example, according to one or more of the intended routes. If none of the intended routes indicated by the AV 102A are acceptable, the service assignment system 104 may select a different candidate AV (e.g., AV 102B) and exchange route negotiation data 112N with that AV, for example, until an AV for executing the transportation service is found.

In some examples, the service assignment system 104 is configured to exchange route negotiation data 112A, 112B, 112N with more than one AV 102A, 102B, 102N at a time. For example, the service assignment system 104 (e.g., the transportation service selection engine 112) may select more than one candidate AV 102A, 102B, 102N. Accordingly, the routing engine 110 may generate proposed routes for more than one candidate AV 102A, 102B, 102N. The service assignment system 104 may receive intended route data indicating intended routes from one or more of the candidate AVs 102A, 102B, 102N.

In some examples, one or more of the AVs 102A, 102B, 102N provides route negotiation data 112A, 112N indicating a state of the AV 102A, 102B, 102N such as, for example, an amount of fuel onboard. State data from an AV 102A, 102B, 102N may be used when assigning subsequent transportation services. For example, if the service assignment system 104 is aware that an AV 102A, 102B, 102N lacks sufficient fuel to execute a route, the service assignment system 104 may not propose that route to the AV 102A, 102B, 102N.

The transportation service selection engine 112 uses the intended routes to select an AV 102A, 102B, 102N best suited to execute the transportation service. For example, the candidate AV 102A, 102B, 102N best suited to execute a transportation service may be the candidate AV 102A, 102B, 102N having the lowest-cost route for the transportation service.

In some examples, the transportation service selection engine 112 uses other metrics associated with particular types of AVs 102A, 102B, 102N in addition to or instead of the proposed routes to select an AV 102A, 102B, 102N for executing a transportation service. The transportation service selection engine 112 can weigh the cost of the proposed routes based on type metrics associated with the candidate AVs 102A, 102B, 102N. Non-limiting examples of type metrics include, for example, an estimated time of arrival (ETA) at the service start location, an estimated drop-off time (ETD) at the service end location, a price to the user 114A, 114B, 114N, an average customer rating for the AV 102A, 102B, 102N and/or a manufacturer or manager of the vehicle, an availability status of the AVs 102A, 102B, 102N, an acceptance rate for the AVs 102A, 102B, 102N, etc.

In some examples, the transportation service selection engine 112 receives and utilizes negotiation data, such as negotiation data 112B, from a third-party system 103. The third-party system 103 may be or include, for example, a system associated with a municipality, police authority, or other suitable party. Proposed routes and/or proposed AVs 102A, 102B, 102N for a transportation service may be provided to the third-party system 103. The third-party system 103, in response, provides third-party preference data. The third-party preference data may indicate an AV 102A, 102B, 102N and/or route that the third-party system favors or disfavors for a given route. This may be taken into account by the transportation service selection engine 112 when assigning the transportation service. In some examples, more than one round of negotiation data 112B can be exchanged between the transportation service selection engine 112 and the third-party system 103. For example, if an AV 102A, 102B, 102N proposes one or more alternative routes, the alternative routes may also be provided to the third-party system 103 and the third-party system 103 may provide additional third-party preference data based on the alternative route or routes.

Also, in some examples, the transportation service selection engine 112 considers user input when selecting an AV 102A, 102B, 102N or route for a transportation service. For example, the transportation service selection engine 112 or other suitable component provides proposed routes and/or proposed AVs 102A, 102B, 102N for a transportation service to the user 114A, 114B, 114N who requested the service (e.g., via user computing devices 116A, 116B, 116N). The user 114A, 114B, 114N may provide an indication of one or more favored or disfavored routes and/or AVs 102A, 102B, 102N. The transportation service selection engine 112 may take this into account when assigning the transportation service. In some examples, more than one round of data can be exchanged between the transportation service selection engine 112 and the user 114A, 114B, 114N requesting a transportation service. For example, if an AV 102A, 102B, 102N proposes one or more alternative routes, the alternative routes may also be provided to the user 114A, 114B, 114N and the user may provide additional user preference data based on the alternative route or routes.

The transportation service selection engine 112 offers the requested transportation service to the selected AV 102A, 102B, 102N and instructs the AV 102A, 102B, 102N to begin executing the transportation service. In some examples, the selected AV 102A, 102B, 102N may optionally decline the transportation service, for example, by sending a declination message to the transportation service selection engine 112. If the selected AV 102A, 102B, 102N declines the transportation service, the transportation service selection engine 112 may offer the transportation service to another AV 102A, 102B, 102N, for example, a vehicle having the next-lowest cost intended route and/or the next most favorable combination of intended route and other metrics.

In some examples, the service assignment system 104 is configured to consider the prior behavior of AVs 102A, 102B, 102N when selecting an AV 102A, 102B, 102N for executing a transportation service. For example, an AV 102A, 102B, 102N that is instructed to execute a transportation service according to an intended route may deviate from the intended route when executing the transportation service. In some examples, the service assignment system 104 receives actual route data describing actual routes traversed by one or more AVs 102A, 102B, 102N to execute transportation services. The actual route data can be compared to the intended routes for the various transportation services. Results of the comparison can be used by the service assignment system 104 to select a candidate AV or AVs 102A, 102B, 102N, to generate candidate routes, and/or to evaluate an intended route or route received from an AV 102A, 102B, 102N with route negotiation data 112A, 112B, 112N.

In some examples, comparing actual route data to intended route data generates a set of difference roadway elements. The difference roadway elements indicate roadway elements of the intended route for a transportation service that were not actually traversed by the AV 102A, 102B, 102N. In some examples, difference roadway elements include all roadway elements from an intended route that were not actually traversed by the AV 102A, 102B, 102N. In other examples, difference roadway elements include (or are limited to) roadway elements at or near a location where the AV 102A, 102B, 102N began to deviate from the intended route.

In some examples, comparing roadway elements from intended routes and actual routes can include determining a comparison score. For example, it will be appreciated that difference roadway elements may be weighted in different ways. For example, a difference roadway element may be weighted based on the frequency or percentage of actual trips on which it is a difference roadway element. For example, if a first roadway element results in a deviation of an AV or AV type from an intended route 30% of the time and a second roadway element results in a deviation of an AV or AV type from an intended route 70% of the time, the second roadway element may be weighted higher.

In some examples, results of comparing intended routes to actual routes can be used by the service assignment system 104 (e.g., the transportation service selection engine 112 thereof) when selecting candidate AVs 102A, 102B, 102N. For example, if an AV 102A, 102B, 102N or type of AV 102A, 102B, 102N deviates from intended routes with more than a threshold frequency and/or by more than a threshold amount, the service assignment system 104 may be less likely to select that AV or AV type as a candidate AV.

In some examples, results of comparing intended routes to actual routes can be used by the service assignment system (e.g., the transportation service selection engine 112 thereof) when providing candidate routes to an AV 102A, 102B, 102N. For example, the service assignment system 104 may be configured to identify candidate routes generated by the routing engine 110 that include difference roadway elements for a given AV or type of AV. Candidate routes that include more than a threshold number of difference roadway elements may be culled and not provided to the AV or AVs 102A, 102B, 102N. In this way, the service assignment system 104 may avoid assigning transportation services to an AV 102A, 102B, 102N with routes from which the AV is likely to deviate.

In another example, results of comparing intended routes to actual routes can be used by the service assignment system (e.g., the transportation service selection engine 112 thereof) to determine whether a given intended route is acceptable and/or to decide between multiple AVs 102A, 102B, 102N that have provided intended routes. For example, the service assignment system 104 may determine that an intended route is acceptable, for example, if it includes less than a threshold number of difference roadway elements. Also, for example, when comparing two intended routes provided by the same AV or by different AVs 102A, 102B, 102N, the service assignment system 104 may favor the intended route that includes fewer difference roadway elements.

FIG. 2 depicts a block diagram of an example vehicle 200 according to example aspects of the present disclosure. The vehicle 200 includes one or more sensors 201, a vehicle autonomy system 202, and one or more vehicle controls 207. The vehicle 200 is an autonomous vehicle, as described herein. The example vehicle 200 shows just one example arrangement of an autonomous vehicle. In some examples, autonomous vehicles of different types can have different arrangements.

The vehicle autonomy system 202 includes a commander system 211, a navigator system 213, a perception system 203, a prediction system 204, a motion planning system 205, and a localizer system 230 that cooperate to perceive the surrounding environment of the vehicle 200 and determine a motion plan for controlling the motion of the vehicle 200 accordingly.

The vehicle autonomy system 202 is engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate route through the environment. The vehicle autonomy system 202 sends commands to control the one or more vehicle controls 207 to operate the vehicle 200 according to the route.

Various portions of the vehicle autonomy system 202 receive sensor data from the one or more sensors 201. For example, the sensors 201 may include remote-detection sensors as well as motion sensors such as an inertial measurement unit (IMU), one or more encoders, or one or more odometers. The sensor data includes information that describes the location of objects within the surrounding environment of the vehicle 200, information that describes the motion of the vehicle 200, etc.

The sensors 201 may also include one or more remote-detection sensors or sensor systems, such as a LIDAR system, a RADAR system, one or more cameras, etc. As one example, a LIDAR system of the one or more sensors 201 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 201 may generate sensor data (e.g., remote-detection sensor data) including still or moving images.

Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 201 can include a positioning system. The positioning system determines a current position of the vehicle 200. The positioning system can be any device or circuitry for analyzing the position of the vehicle 200. For example, the positioning system can determine a position by using one or more of inertial sensors, a satellite positioning system such as the Global Positioning System (GPS), a positioning system based on IP address, triangulation and/or proximity to network access points or other network components (e.g., cellular towers, Wi-Fi access points), and/or other suitable techniques. The position of the vehicle 200 can be used by various systems of the vehicle autonomy system 202.

Thus, the one or more sensors 201 are used to collect sensor data that includes information that describes the location (e.g., in three-dimensional space relative to the vehicle 200) of points that correspond to objects within the surrounding environment of the vehicle 200. In some implementations, the sensors 201 can be positioned at different locations on the vehicle 200. As an example, in some implementations, one or more cameras and/or LIDAR sensors can be located in a pod or other structure that is mounted on a roof of the vehicle 200, while one or more RADAR sensors can be located in or behind the front and/or rear bumper(s) or body panel(s) of the vehicle 200. As another example, one or more cameras can be located at the front or rear bumper(s) of the vehicle 200. Other locations can be used as well.

The localizer system 230 receives some or all of the sensor data from the sensors 201 and generates vehicle poses for the vehicle 200. A vehicle pose describes a position and attitude of the vehicle 200. The vehicle pose (or portions thereof) can be used by various other components of the vehicle autonomy system 202 including, for example, the perception system 203, the prediction system 204, the motion planning system 205, and the navigator system 213.

The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis, and a roll about a second horizontal axis. In some examples, the localizer system 230 generates vehicle poses periodically (e.g., every second, every half second). The localizer system 230 appends time stamps to vehicle poses, where the time stamp for a pose indicates the point in time that is described by the pose. The localizer system 230 generates vehicle poses by comparing sensor data (e.g., remote-detection sensor data) to map data 226 describing the surrounding environment of the vehicle 200.

In some examples, the localizer system 230 includes one or more pose estimators and a pose filter. Pose estimators generate pose estimates by comparing remote-detection sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 230 generates vehicle poses. Accordingly, the pose filter generates some vehicle poses by extrapolating from a previous pose estimate utilizing motion sensor data.

Vehicle poses and/or vehicle positions generated by the localizer system 230 are provided to various other components of the vehicle autonomy system 202. For example, the commander system 211 may utilize a vehicle position to determine whether to respond to a call from a service assignment system 240.

The commander system 211 determines a set of one or more target locations that are used for routing the vehicle 200. The target locations are determined based on user input received via a user interface 209 of the vehicle 200. The user interface 209 may include and/or use any suitable input/output device or devices. In some examples, the commander system 211 determines the one or more target locations considering data received from the service assignment system 240. The service assignment system 240 is programmed to provide instructions to multiple vehicles, for example, as part of a fleet of vehicles for moving passengers and/or cargo. Data from the service assignment system 240 can be provided via a wireless network, for example.

The navigator system 213 receives one or more target locations from the commander system 211 and map data 226. The map data 226, for example, provides detailed information about the surrounding environment of the vehicle 200. The map data 226 provides information regarding identity and location of different roadways and roadway elements. A roadway is a place where the vehicle 200 can drive and may include, for example, a road, a street, a highway, a lane, a parking lot, or a driveway. Routing graph data is a type of map data 226.

From the one or more target locations and the map data 226, the navigator system 213 generates route data describing a route for the vehicle 200 to take to arrive at the one or more target locations. In some implementations, the navigator system 213 determines route data using one or more path-planning algorithms based on costs for graph elements/corresponding roadway elements, as described herein. For example, a cost for a route can indicate a time of travel, risk of danger, or other factor associated with adhering to a particular proposed route. Route data describing a route is provided to the motion planning system 205, which commands the vehicle controls 207 to implement the route or route extension, as described herein. The navigator system 213 can generate routes as described herein using a general-purpose routing graph and routing graph modification data. Also, in examples where route data is received from the service assignment system 240, that route data can also be provided to the motion planning system 205.

The perception system 203 detects objects in the surrounding environment of the vehicle 200 based on sensor 201 data, the map data 226, and/or vehicle poses provided by the localizer system 230. For example, the map data 226 used by the perception system 203 describes roadways and segments thereof and may also describe buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto.

In some examples, the perception system 203 determines state data for one or more of the objects in the surrounding environment of the vehicle 200. State data describes a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle, pedestrian, bicycle, or other); yaw rate; distance from the vehicle 200; minimum path to interaction with the vehicle 200; minimum time duration to interaction with the vehicle 200; and/or other state information.

In some implementations, the perception system 203 determines state data for each object over a number of iterations. In particular, the perception system 203 updates the state data for each object at each iteration. Thus, the perception system 203 detects and tracks objects, such as other vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 generates prediction data associated with one or more of the objects detected by the perception system 203. In some examples, the prediction system 204 generates prediction data describing each of the respective objects detected by the perception system 203.

Prediction data for an object is indicative of one or more predicted future locations of the object. For example, the prediction system 204 may predict where the object will be located within the next 5 seconds, 30 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the localizer system 230 and/or map data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) approaching an intersection and maneuvering into a left-turn lane intends to turn left. In such a situation, the prediction system 204 predicts a trajectory (e.g., path) corresponding to a left turn for the vehicle such that the vehicle turns left at the intersection. Similarly, the prediction system 204 determines predicted trajectories for other objects, such as bicycles, pedestrians, parked vehicles, etc. The prediction system 204 provides the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object, and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 commands the vehicle controls 207 based at least in part on the predicted trajectories associated with the objects within the surrounding environment of the vehicle 200, the state data for the objects provided by the perception system 203, vehicle poses provided by the localizer system 230, the map data 226, and route or route extension data provided by the navigator system 213. Stated differently, given information about the current locations of objects and/or predicted trajectories of objects within the surrounding environment of the vehicle 200, the motion planning system 205 determines control commands for the vehicle 200 that best navigate the vehicle 200 along the route or route extension relative to the objects at such locations and their predicted trajectories on acceptable roadways.

In some implementations, the motion planning system 205 can also evaluate one or more cost functions and/or one or more reward functions for each of one or more candidate control commands or sets of control commands for the vehicle 200. Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate control command or set of control commands. The motion planning system 205 can select or determine a control command or set of control commands for the vehicle 200 based at least in part on the cost function(s) and the reward function(s). For example, the motion plan that minimizes the total cost can be selected or otherwise determined.

In some implementations, the motion planning system 205 can be configured to iteratively update the route or route extension for the vehicle 200 as new sensor data is obtained from the one or more sensors 201. For example, as new sensor data is obtained from the one or more sensors 201, the sensor data can be analyzed by the perception system 203, the prediction system 204, and the motion planning system 205 to determine the motion plan.

The motion planning system 205 can provide control commands to the one or more vehicle controls 207. For example, the one or more vehicle controls 207 can include throttle systems, brake systems, steering systems, and other control systems, each of which can include various vehicle controls (e.g., actuators or other devices that control gas flow, steering, and braking) to control the motion of the vehicle 200. The various vehicle controls 207 can include one or more controllers, control devices, motors, and/or processors.

The vehicle controls 207 include a brake control module 220. The brake control module 220 is configured to receive a braking command and bring about a response by applying (or not applying) the vehicle brakes. In some examples, the brake control module 220 includes a primary system and a secondary system. The primary system receives braking commands and, in response, brakes the vehicle 200. The secondary system may be configured to determine a failure of the primary system to brake the vehicle 200 in response to receiving the braking command.

A steering control system 232 is configured to receive a steering command and bring about a response in the steering mechanism of the vehicle 200. The steering command is provided to a steering system to provide a steering input to steer the vehicle 200.

A lighting/auxiliary control module 236 receives a lighting or auxiliary command. In response, the lighting/auxiliary control module 236 controls a lighting and/or auxiliary system of the vehicle 200. Controlling a lighting system may include, for example, turning on, turning off, or otherwise modulating headlights, parking lights, running lights, etc. Controlling an auxiliary system may include, for example, modulating windshield wipers, a defroster, etc.

A throttle control system 234 is configured to receive a throttle command and bring about a response in the engine speed or other throttle mechanism of the vehicle. For example, the throttle control system 234 can instruct an engine and/or engine controller, or other propulsion system component, to control the engine or other propulsion system of the vehicle 200 to accelerate, decelerate, or remain at its current speed.

Each of the perception system 203, the prediction system 204, the motion planning system 205, the commander system 211, the navigator system 213, and the localizer system 230 can be included in or otherwise be a part of the vehicle autonomy system 202 configured to control the vehicle 200 based at least in part on data obtained from the one or more sensors 201. For example, data obtained by the one or more sensors 201 can be analyzed by each of the perception system 203, the prediction system 204, and the motion planning system 205 in a consecutive fashion in order to control the vehicle 200. While FIG. 2 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 202 includes one or more computing devices, which may implement all or parts of the perception system 203, the prediction system 204, the motion planning system 205, and/or the localizer system 230. Descriptions of hardware and software configurations for computing devices to implement the vehicle autonomy system 202 and/or the service assignment system 104 of FIG. 1 are provided herein with reference to FIGS. 6 and 7.

Figure 3:
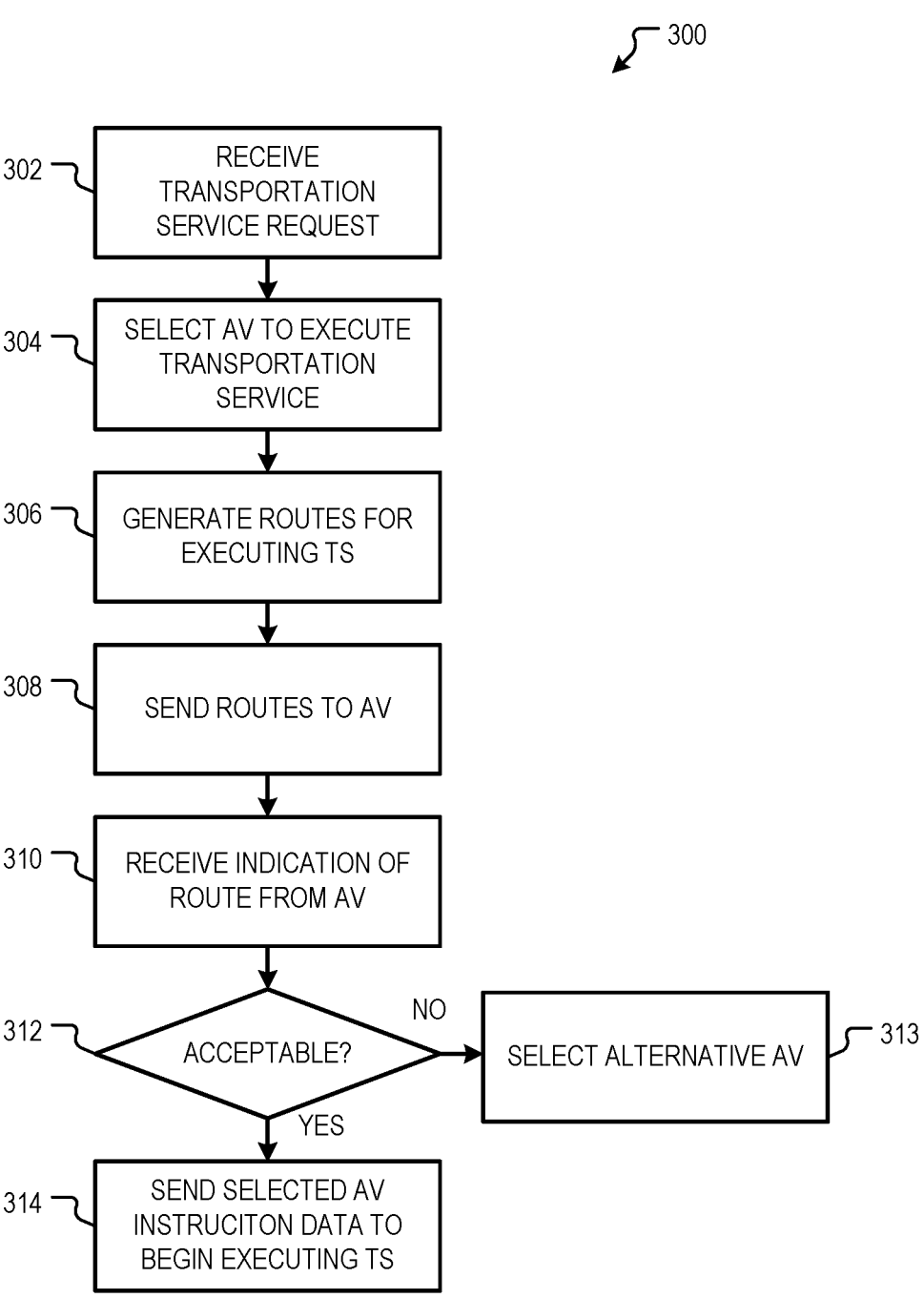
FIG. 3 is a flowchart showing one example of a process flow that can be executed by the service assignment system of FIG. 1 to jointly route a transportation service with one or more AVs.

FIG. 3 is a flowchart showing one example of a process flow 300 that can be executed by the service assignment system 104 to jointly route a transportation service with one or more AVs 102A, 102B, 102N. At operation 302, the service assignment system 104 receives a transportation service request. The transportation service request may originate from user 114A, 114B, 114N. For example, the user 114A, 114B, 114N may utilize a user computing device 116A, 116B, 116N that executes an application that receives a user input indicating the desired transportation service and sends a transportation service request to the service assignment system.

At operation 304, the service assignment system 104 selects an AV 102A, 102B, 102N to execute the transportation service requested by the user 114A, 114B, 114N. The service assignment system 104 selects the AV 102A in any suitable manner. In some examples, the service assignment system 104 selects the AV 102A, 102B, 102N based on a current location of the selected AV 102A, 102B, 102N, the service start position for the transportation service, and/or whether the selected AV 102A, 102B, 102N is capable of executing the transportation service.

At operation 306, the service assignment system 104 generates a set of proposed routes that the selected AV 102A, 102B, 102N can traverse to execute the transportation service. The proposed routes may begin at a current location of the selected AV 102A, 102B, 102N and progress to the service start position and then to the service end position. (In some examples, the routes may include one or more waypoints as well.) The service assignment system 104 may generate the set of proposed routes in any suitable manner. In some examples, the service assignment system 104 (e.g., the routing engine 110 thereof) may find the lowest cost route for traversing a routing graph as well as a set of additional routes that have a higher cost than the lowest cost route. In other examples, the service assignment system 104 (e.g., the routing engine 110 thereof) may generate different proposed routes using different routing algorithms. In yet another example, the service assignment system 104 may generate different proposed routes by selecting different waypoints. For example, the service assignment system 104 may generate one proposed route (or set of proposed routes) that utilizes a particular roadway and another proposed route or set of proposed routes that utilize a different roadway.

At operation 308, the service assignment system 104 provides the routes generated at operation 306 to the selected AV 102A, 102B, 102N. At operation 310, the AV 102A, 102B, 102N provides an intended route that the selected AV 102A, 102B, 102N would take to execute the transportation service. The intended route may be selected from the proposed routes provided by the service assignment system 104 or may be a different route. For example, the selected AV 102A, 102B, 102N may utilize an onboard routing engine or remote routing engine to generate the intended route, for example, according to policies and/or vehicle capability constraints known to the selected AV 102A, 102B, 102N or an operator thereof.

The service assignment system 104 receives an indication of the intended route from the selected AV 102A, 102B, 102N at operation 310. At operation 312, the selected AV 102A, 102B, 102N determines if the intended route is acceptable. If the intended route is one of the proposed routes, then the service assignment system 104 may determine that the intended route is acceptable.

If the intended route is not one of the proposed routes, the service assignment system 104 may use other techniques to determine whether the intended route is acceptable. For example, the service assignment system 104 may compare the intended route to one or more policies and/or compare the intended route to one or more capabilities of the AV 102A, 102B, 102N. The policies and/or capabilities may be provided by the selected AV 102A, 102B, 102N and/or a proprietor of the selected AV 102A, 102B, 102N. In other examples, the policies and/or capabilities are derived by the service assignment system 104. In another example, the service assignment system 104 may determine if the intended route is acceptable, at least in part, by comparing the intended route to the proposed routes. If the intended route deviates from one of the proposed routes by less than a threshold amount, it may be considered acceptable.

If the intended route is not acceptable, the service assignment system 104 selects an alternative AV to execute the requested transportation service at operation 313. If the intended route is acceptable, the service assignment system 104, at operation 314, sends instruction data to the selected AV 102A, 102B, 102N, where the instruction data instructs the selected AV 102A, 102B, 102N to begin executing the transportation service. In examples where the intended route is not one of the proposed routes, the instruction data may include acceptance data indicating that the service assignment system 104 accepts the intended route from the selected AV 102A, 102B, 102N.

Figure 4:
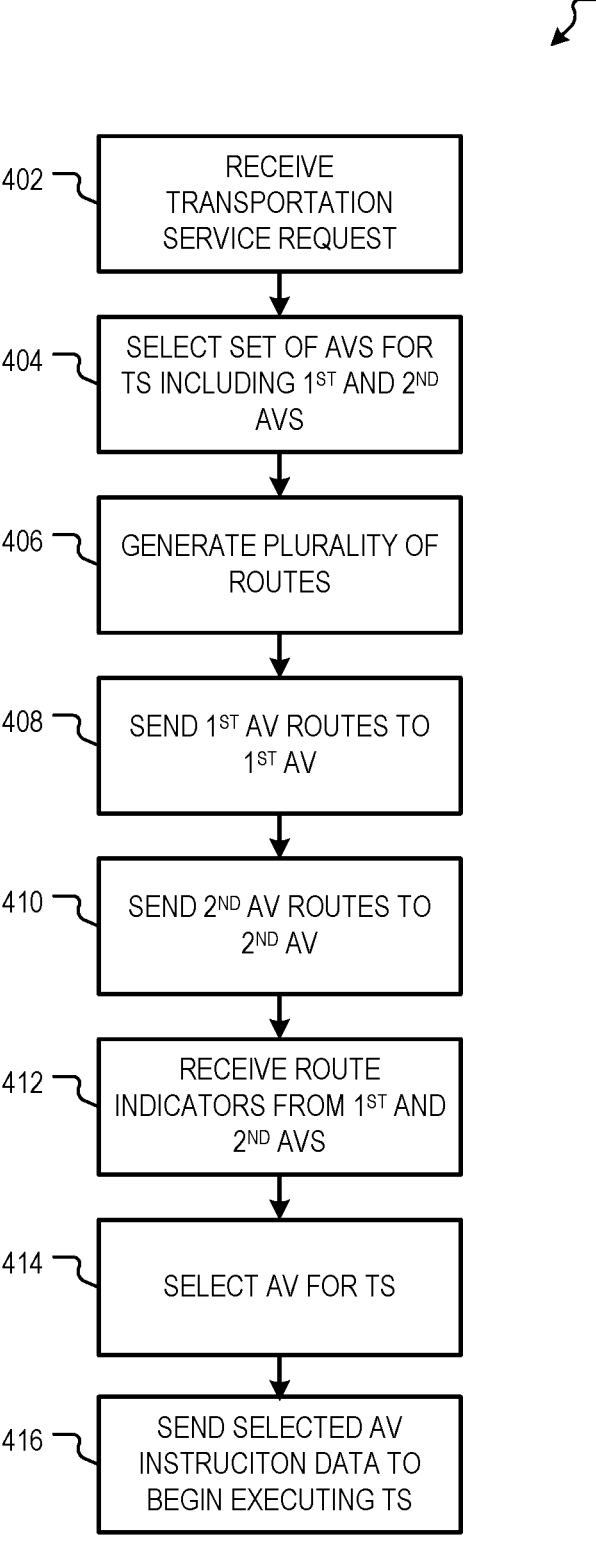
FIG. 4 is a flowchart showing one example of a process flow that can be executed by the service assignment system to jointly route a transportation service with multiple AVs.

FIG. 4 is a flowchart showing one example of a process flow 400 that can be executed by the service assignment system 104 to jointly route a transportation service with multiple AVs 102A, 102B, 102N. At operation 402, the service assignment system 104 receives a transportation service request. The transportation service request may originate from user 114A, 114B, 114N via a user computing device 116A, 116B, 116N, as described herein.

At operation 404, the service assignment system 104 selects a set of candidate AVs 102A, 102B. In the example of FIG. 4, there are two candidate AVs 102A and 102B. In other examples, however, there may be additional candidate AVs. The candidate AVs 102A, 102B can be selected on any suitable criteria such as, for example, current location, the service start location, whether the AV is capable of executing the transportation service, etc.

At operation 406, the service assignment system 104 generates a plurality of suggested routes. For example, the service assignment system 104 may generate a plurality of suggested routes for each candidate AV 102A, 102B. For example, the suggested routes may include a first set of suggested routes for the AV 102A, a second set of suggested routes for the second AV 102B, and so on if there are additional candidate AVs.

At operation 408, the service assignment system 104 sends the candidate routes for the first candidate AV 102A to the first candidate AV 102A. At operation 410, the service assignment system 104 sends the candidate routes for the second candidate AV 102B to the second candidate AV 102B. At operation 412, the service assignment system 104 receives intended routes from the candidate AVs 102A, 102B.

At operation 414, the service assignment system 104 selects one of the candidate AVs 102A, 102B to execute the transportation service. The selection may be made, for example, based on the intended routes received from the candidate AVs 102A, 102B. In some examples, the service assignment system 104 determines whether the intended routes received from the candidate AVs 102A, 102B are acceptable, for example, as described herein. The service assignment system 104 may not select an AV 102A, 102B that has provided an intended route that is not acceptable. For example, if only one candidate AV 102A, 102B, has provided an intended route that is acceptable, that candidate AV 102A, 102B may be selected to execute the transportation service.

The service assignment system 104, in some examples, may also consider whether the intended routes of the candidate AVs 102A, 102B were selected from the proposed routes provided by the service assignment system 104. The service assignment system 104, in some examples, may favor AVs 102A, 102B, 102N that provide intended routes selected from the proposed routes. For example, if only one candidate AV 102A, 102B provides a route selected from the proposed routes for that candidate AV 102A, 102B, that candidate AV 102A, 102B may be selected for the transportation service.

In another example, the service assignment system 104 may compare the intended routes received from the candidate AVs 102A, 102B. For example, the service assignment system 104 may determine a time to complete the transportation service for the candidate AV 102A on its intended route and a time to complete the transportation service for the candidate AV 102B on its intended route. The candidate AV 102A, 102B with the lowest time to complete the transportation service may be awarded the transportation service. In some examples, the service assignment system 104 may consider the time for the respective candidate AVs 102A, 102B to arrive at the service start location on their respective intended routes.

At operation 416, the service assignment system 104 sends instruction data to the AV 102A, 102B selected to execute the transportation service. The instruction data may include acceptance data indicating that the service assignment system 104 accepts the intended route provided by the selected AV 102A, 102B.

Figure 5:
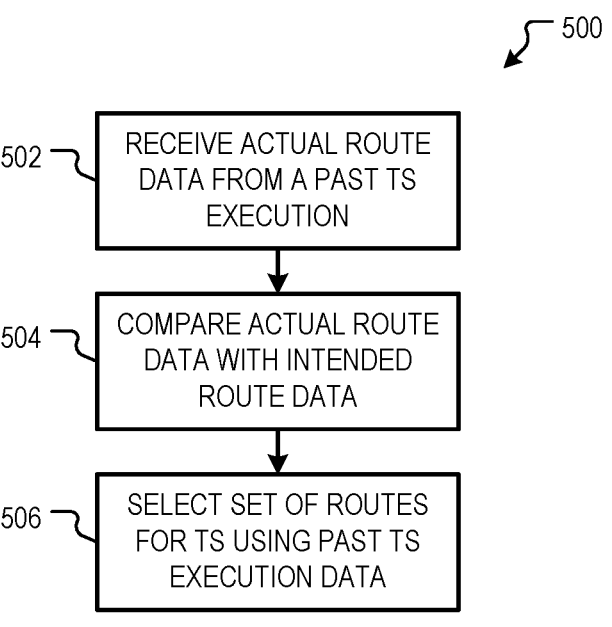
FIG. 5 is a flowchart showing one example of a process flow that may be executed by the service assignment system to consider actual route data to jointly route a transportation service with one or more AVs.

FIG. 5 is a flowchart showing one example of a process flow 500 that may be executed by the service assignment system 104 to consider actual route data to jointly route a transportation service with one or more AVs 102A, 102B, 102N. At operation 502, the service assignment system 104 receives actual route data describing a previously-defined transportation service. The actual route data describes a route actually executed by a particular AV 102A, 102B, 102N to execute a transportation service. The actual route data may be determined by a sensor located at the AV 102A, 102B, 102N. For example, actual route data may include and/or be generated from one or more global positioning system (GPS) traces, lidar point cloud data, and/or other remote sensor data captured at the AV 102A, 102B.

At operation 504, the service assignment system 104 compares the actual route data with the intended route data provided by the AV 102A, 102B, 102N prior to executing the transportation service. This may produce difference data describing a difference between the intended route and the actual route. The difference data indicates where the AV 102A, 102B, 102N deviated from its intended route while executing the transportation service.

At operation 506, the service assignment system 104 selects a set of proposed routes for a new transportation service using the difference data. For example, the service assignment system 104, when generating the proposed routes, may tend to avoid roadway elements having properties similar to those of roadway elements described by the reference data. In other examples, the service assignment system 104 selects an AV 102A, 102B, 102N to execute a transportation service based on the difference data. For example, an AV 102A, 102B, 102N that tends to deviate from the intended route may be disfavored for receiving a transportation service.

Figure 6:
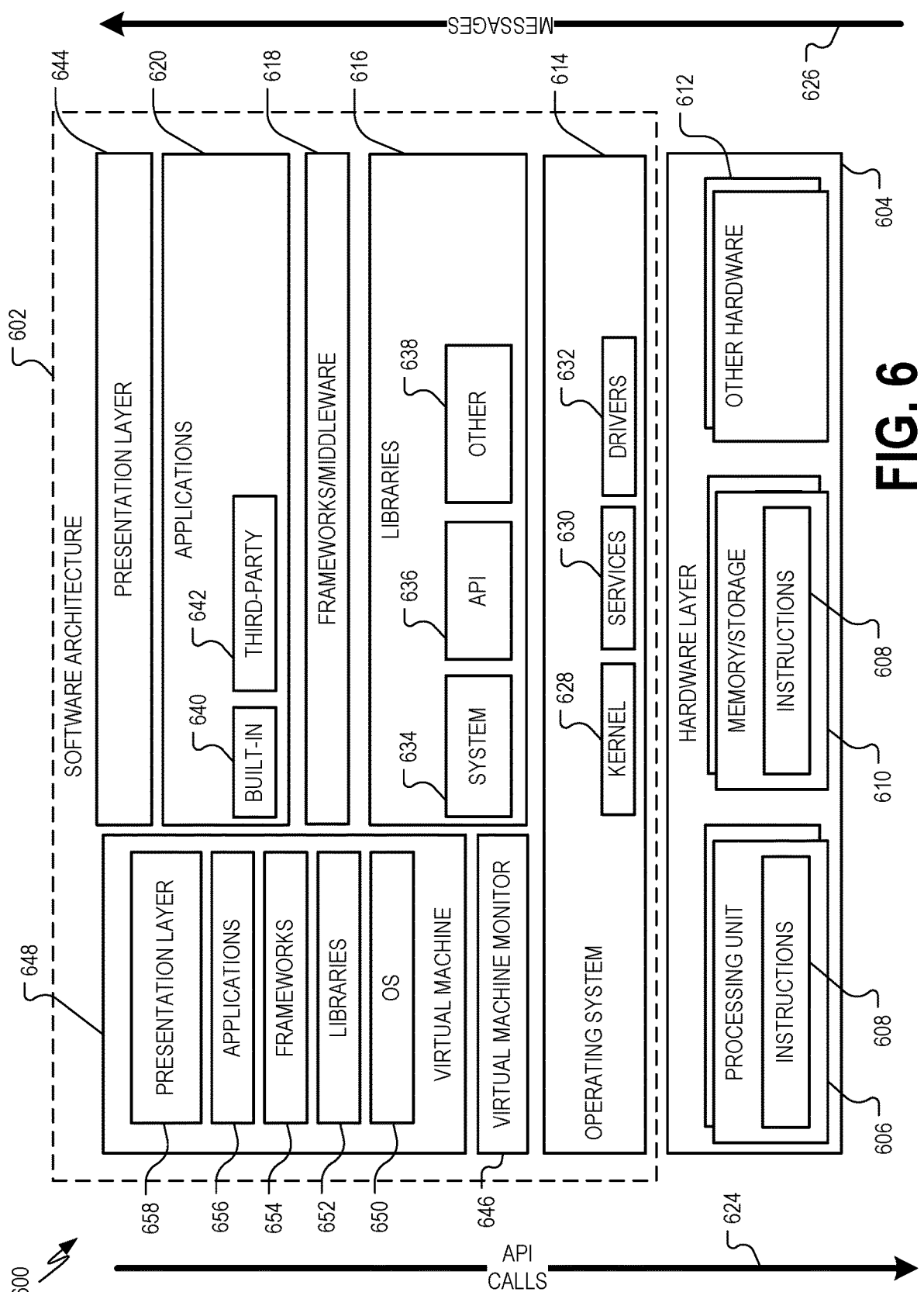
FIG. 6 is a block diagram showing one example of a software architecture for a computing device.

FIG. 6 is a block diagram 600 showing one example of a software architecture 602 for a computing device. The software architecture 602 may be used in conjunction with various hardware architectures, for example, as described herein. FIG. 6 is merely a non-limiting example of a software architecture 602, and many other architectures may be implemented to facilitate the functionality described herein. A representative hardware layer 604 is illustrated and can represent, for example, any of the above-referenced computing devices. In some examples, the hardware layer

Figure 7:
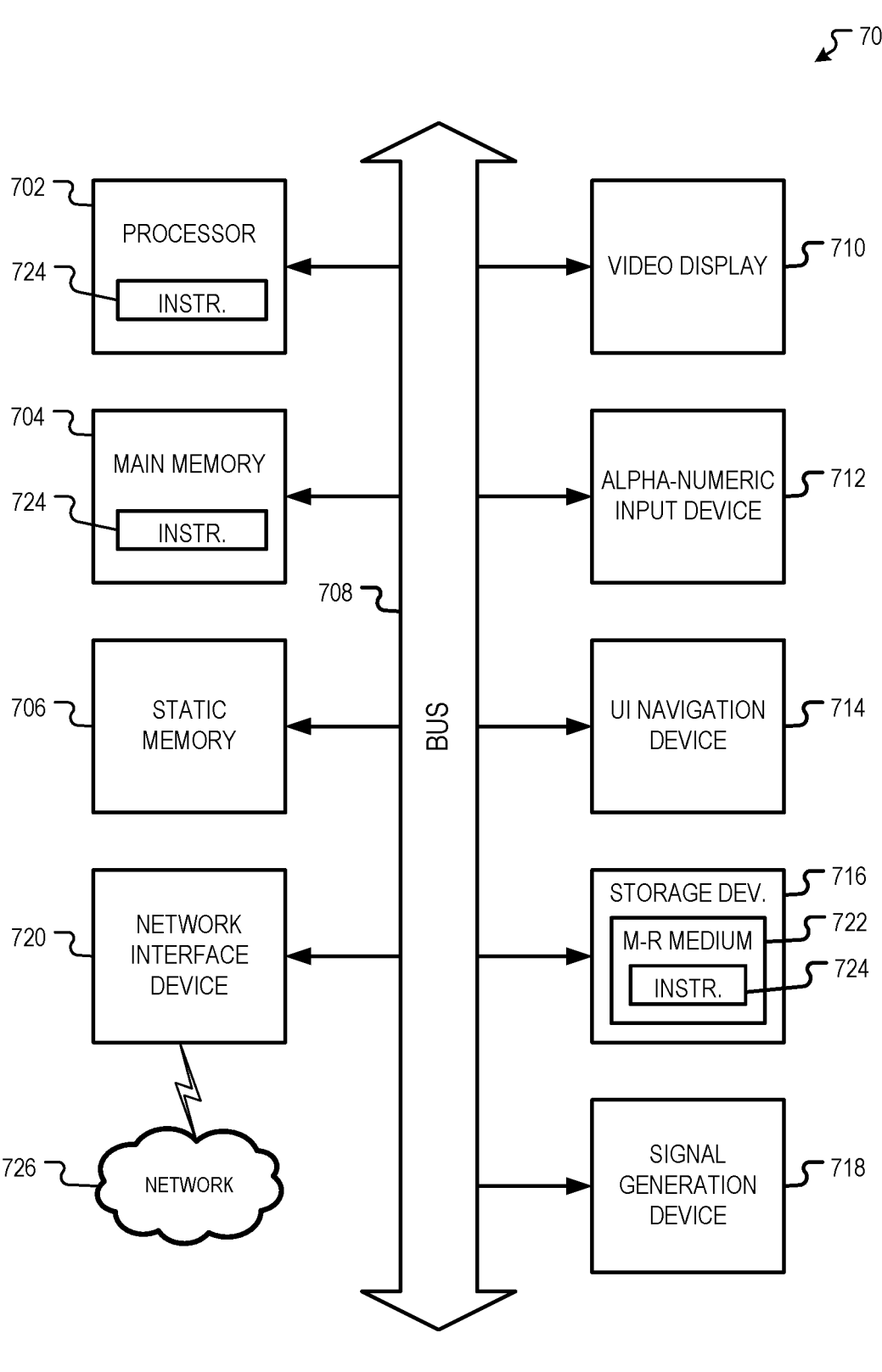
FIG. 7 is a block diagram illustrating a computing device hardware architecture.

604 may be implemented according to an architecture 700 of FIG. 7 and/or the software architecture 602 of FIG. 6.

The representative hardware layer 604 comprises one or more processing units 606 having associated executable instructions 608. The executable instructions 608 represent the executable instructions of the software architecture 602, including implementation of the methods, modules, components, and so forth of FIGS. 1-5. The hardware layer 604 also includes memory and/or storage modules 610, which also have the executable instructions 608. The hardware layer 604 may also comprise other hardware 612, which represents any other hardware of the hardware layer 604, such as the other hardware illustrated as part of the architecture 700.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and a presentation layer 644. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature, and not all software architectures have all layers. For example, some mobile or special-purpose operating systems may not provide a frameworks/middleware 618 layer, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of a hardware or software interrupt and, in response, cause the software architecture 602 to pause its current processing and execute an interrupt service routine (ISR) when an interrupt is received. The ISR may generate an alert.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than by interfacing directly with the underlying operating system 614 functionality (e.g., kernel 628, services 630, and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be used by the applications 620 and/or other software components/modules. For example, the frameworks 618 may provide various graphical user interface (GUI) functions, high-level resource management, high-level location services, and so forth. The frameworks 618 may provide a broad spectrum of other APIs that may be used by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. The third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 642 may invoke the API calls 624 provided by the mobile operating system such as the operating system 614 to facilitate functionality described herein.

The applications 620 may use built-in operating system functions (e.g., kernel 628, services 630, and/or drivers 632), libraries (e.g., system libraries 634, API libraries 636, and other libraries 638), or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 6, this is illustrated by a virtual machine 648. A virtual machine creates a software environment where applications/modules can execute as if they were executing on a hardware computing device. The virtual machine 648 is hosted by a host operating system (e.g., the operating system 614) and typically, although not always, has a virtual machine monitor 646, which manages the operation of the virtual machine 648 as well as the interface with the host operating system (e.g., the operating system 614). A software architecture executes within the virtual machine 648, such as an operating system 650, libraries 652, frameworks/middleware 654, applications 656, and/or a presentation layer 658. These layers of software architecture executing within the virtual machine 648 can be the same as corresponding layers previously described or may be different.

FIG. 7 is a block diagram illustrating a computing device hardware architecture 700, within which a set or sequence of instructions can be executed to cause a machine to perform examples of any one of the methodologies discussed herein. The hardware architecture 700 describes a computing device for executing the vehicle autonomy system, described herein.

The architecture 700 may operate as a standalone device or may be connected (e.g., networked) to other machines. In a networked deployment, the architecture 700 may operate in the capacity of either a server or a client machine in server-client network environments, or it may act as a peer machine in peer-to-peer (or distributed) network environments. The architecture 700 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 700 includes a processor unit 702 comprising at least one processor (e.g., a central processing unit (CPU), a graphics processing unit (GPU), or both, processor cores, compute nodes). The architecture 700 may further comprise a main memory 704 and a static memory 706, which communicate with each other via a link 708 (e.g., a bus). The architecture 700 can further include a video display unit 710, an input device 712 (e.g., a keyboard), and a UI navigation device 714 (e.g., a mouse). In some examples, the video display unit 710, input device 712, and UI navigation device 714 are incorporated into a touchscreen display. The architecture 700 may additionally include a storage device 716 (e.g., a drive unit), a signal generation device 718 (e.g., a speaker), a network interface device 720, and one or more sensors (not shown), such as a Global Positioning System (GPS) sensor, compass, accelerometer, or other sensor.

In some examples, the processor unit 702 or another suitable hardware component may support a hardware interrupt. In response to a hardware interrupt, the processor unit 702 may pause its processing and execute an ISR, for example, as described herein.

The storage device 716 includes a machine-readable medium 722 on which is stored one or more sets of data structures and instructions 724 (e.g., software) embodying or used by any one or more of the methodologies or functions described herein. The instructions 724 can also reside, completely or at least partially, within the main memory 704, within the static memory 706, and/or within the processor unit 702 during execution thereof by the architecture 700, with the main memory 704, the static memory 706, and the processor unit 702 also constituting machine-readable media.

Executable Instructions and Machine-Storage Medium

The various memories (i.e., 704, 706, and/or memory of the processor unit(s) 702) and/or the storage device 716 may store one or more sets of instructions and data structures (e.g., the instructions 724) embodying or used by any one or more of the methodologies or functions described herein. These instructions, when executed by the processor unit(s) 702, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both non-transitory machine-storage media and signal media. Thus, the terms include both storage devices/media and carrier waves/modulated data signals.

The instructions 724 can further be transmitted or received over a communications network 726 using a transmission medium via the network interface device 720 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A service assignment system for providing transportation services, comprising:
  at least one processor programmed to perform operations comprising:
    receiving a transportation service request from a user, the transportation service request describing a transportation service having a service start location and a service end location;
    generating a plurality of routes for executing the transportation service, each route of the plurality of routes being from the service start location to the service end location;
    sending, to a first autonomous vehicle (AV), proposed route data describing at least a first route and a second route of the plurality of routes;
    receiving, by the at least one processor and from the first AV, route data describing a first vehicle route from the service start location to the service end location, the first vehicle route not being described by the proposed route data;
    receiving, by the at least one processor and from a second AV, route data describing a second vehicle route from the service start location to the service end location;
    based on the first vehicle route received from the first AV and the second vehicle route received from the second AV, selecting the first AV to execute the transportation service; and
    instructing the first AV to begin executing the transportation service, the instructing comprising sending acceptance data to the first AV, the acceptance data indicating acceptance of the first vehicle route.

2. The system of claim 1, the operations further comprising:
  receiving, by the service assignment system, actual route data describing an actual route traversed by the first AV to execute the transportation service;
  determining, by the service assignment system, difference data describing a difference between the first vehicle route and the actual route;

selecting, by the service assignment system, a third AV to execute a second transportation service;
  generating, by the service assignment system, a second plurality of routes for executing the transportation service using the difference data; and
  sending, by the service assignment system to the third AV, second instruction data instructing the second AV to begin executing the transportation service using at least one of the second plurality of routes.

3. The system of claim 1, the operations further comprising,
  generating, by the service assignment system, a first plurality of routes for executing a second transportation service;
  sending, by the service assignment system to a third AV, second proposed route data describing the first plurality of routes for executing the second transportation service;
  receiving, from the third AV, a declination message declining to perform the second transportation service; and
  responsive to receiving the declination message, generating, by the service assignment system, a second plurality of routes for executing the second transportation service.

4. The system of claim 1, the operations further comprising:
  sending, by the service assignment system to the second AV, second proposed route data describing at least a portion of the plurality of routes for executing the transportation service.

5. The system of claim 4, the operations further comprising:
  sending at least a portion of the proposed route data to a third-party system; and
  receiving third-party preference data from the third-party system, wherein the selecting of the first AV is based at least in part on the third-party preference data.

6. The system of claim 4, the operations further comprising:
  sending at least a portion of the proposed route data to the user; and
  receiving user preference data from the user, wherein the selecting of the first AV is based at least in part on the user preference data.

7. The system of claim 1, wherein the route data also describes a second route to execute the transportation service, the instructing of the first AV to begin executing the transportation service comprising sending an indication of the second route.

8. A method for providing transportation services, comprising:
  receiving, by a service assignment system, a transportation service request from a user, the transportation service request describing a transportation service having a service start location and a service end location;
  generating, by the service assignment system, a plurality of routes for executing the transportation service, each route of the plurality of routes being from the service start location to the service end location;
  sending, by the service assignment system to a first autonomous vehicle (AV), proposed route data describing at least a first route of the plurality of routes and a second route of the plurality of routes;
  receiving, by the service assignment system from the first AV, route data describing a first vehicle route from the service start location to the service end location, the first vehicle route not being described by the proposed route data;

receiving, by the service assignment system and from a second AV, route data describing a second vehicle route from the service start location to the service end location;

based on the first vehicle route received from the first AV and the second vehicle route received from the second AV, selecting the first AV to execute the transportation service; and instructing the first AV to begin executing the transportation service, the instructing comprising sending acceptance data to the first AV, the acceptance data indicating acceptance of the first vehicle route.

9. The method of claim 8, further comprising:

receiving, by the service assignment system, actual route data describing an actual route traversed by the first AV to execute the transportation service;

determining, by the service assignment system, difference data describing a difference between the first vehicle route and the actual route;

selecting, by the service assignment system, a second AV to execute a second transportation service;

generating, by the service assignment system, a second plurality of routes for executing the transportation service using the difference data; and sending, by the service assignment system to the second AV, second instruction data instructing the second AV to begin executing the transportation service using at least one of the second plurality of routes.

10. The method of claim 8, further comprising, generating, by the service assignment system, a first plurality of routes for executing a second transportation service;

sending, by the service assignment system to a second AV, second proposed route data describing the first plurality of routes for executing the second transportation service;

receiving, from the second AV, a declination message declining to perform the second transportation service; and responsive to receiving the declination message, generating, by the service assignment system, a second plurality of routes for executing the second transportation service.

11. The method of claim 8, further comprising:

sending, by the service assignment system to the second AV, second proposed route data describing at least a portion of the plurality of routes for executing the transportation service.

12. The method of claim 11, further comprising:

sending at least a portion of the proposed route data to a third-party system; and receiving third-party preference data from the third-party system, wherein the selecting of the first AV is based at least in part on the third-party preference data.

13. The method of claim 11, further comprising:

sending at least a portion of the proposed route data to the user; and receiving user preference data from the user, wherein the selecting of the first AV is based at least in part on the user preference data.

14. The method of claim 8, wherein the route data also describes a second route to execute the transportation service, the instructing of the first AV to begin executing the transportation service comprising sending an indication of the second route.

15. A non-transitory machine-readable medium comprising instructions thereon that, when executed by at least one processor, causes the at least one processor to perform operations comprising:

receiving a transportation service request from a user, the transportation service request describing a transportation service having a service start location and a service end location;

generating a plurality of routes for executing the transportation service, each route of the plurality of routes being from the service start location to the service end location;

sending, to a first autonomous vehicle (AV), proposed route data describing at least a first route of the plurality of routes and a second route of the plurality of routes;

receiving, by the at least one processor and from the first AV, route data describing a vehicle route from the service start location to the service end location, the first vehicle route not being described by the proposed route data;

receiving, by the at least one processor and from a second AV, route data describing a second vehicle route from the service start location to the service end location;

based on the first vehicle route received from the first AV and the second vehicle route received from the second AV, selecting the first AV to execute the transportation service; and instructing the first AV to begin executing the transportation service, the instructing comprising sending acceptance data to the first AV, the acceptance data indicating acceptance of the first vehicle route.

16. The medium of claim 15, the operations further comprising:

receiving, by the at least one processor, actual route data describing an actual route traversed by the first AV to execute the transportation service;

determining, by the at least one processor, difference data describing a difference between the first vehicle route and the actual route;

selecting, by the at least one processor, a third AV to execute a second transportation service;

generating, by the at least one processor, a second plurality of routes for executing the transportation service using the difference data; and sending, by the at least one processor to the third AV, second instruction data instructing the second AV to begin executing the transportation service using at least one of the second plurality of routes.

17. The medium of claim 15, the operations further comprising, generating, by the at least one processor, a first plurality of routes for executing a second transportation service;

sending second proposed route data, by the at least one processor and to a third AV, the second proposed route data describing the first plurality of routes for executing the second transportation service;

receiving, from the third AV, a declination message declining to perform the second transportation service; and responsive to receiving the declination message, generating, by the at least one processor, a second plurality of routes for executing the second transportation service.

18. The medium of claim 15, the operations further comprising:

sending, to the second AV, second proposed route data describing at least a portion of the plurality of routes for executing the transportation service.

19. The medium of claim 18, the operations further comprising:

sending at least a portion of the proposed route data to a third-party system; and receiving third-party preference data from the third-party system, wherein the selecting of the first AV is based at least in part on the third-party preference data.

* * * * *